United States Patent [19]
Weiss

[11] Patent Number: 6,109,784
[45] Date of Patent: Aug. 29, 2000

[54] FAST RESPONSE DIGITAL THERMOMETER

[75] Inventor: John Weiss, Mount Sinai, N.Y.

[73] Assignee: Micro Weiss Electronics, Holtsville, N.Y.

[21] Appl. No.: 09/166,495

[22] Filed: Oct. 5, 1998

[51] Int. Cl.⁷ ................................................. G01K 7/00
[52] U.S. Cl. ........................... 374/164; 374/169; 600/549
[58] Field of Search .................................. 374/164, 169; 600/549

[56] References Cited

U.S. PATENT DOCUMENTS

| | | | |
|---|---|---|---|
| 3,729,998 | 5/1973 | Mueller et al. | 374/134 |
| 3,832,669 | 8/1974 | Mueller et al. | 374/134 |
| 3,832,902 | 9/1974 | Usami et al. | 374/134 |
| 3,834,237 | 9/1974 | Robertson | 374/134 |
| 4,158,965 | 6/1979 | Prosky | 374/134 |
| 4,183,248 | 1/1980 | West . | |
| 4,602,642 | 7/1986 | O'Hara et al. | 600/549 |
| 5,133,606 | 7/1992 | Zaragoza et al. | 374/208 |
| 5,259,389 | 11/1993 | Muramoto et al. | 600/549 |
| 5,392,031 | 2/1995 | Toriumi et al. | 374/102 |
| 5,473,629 | 12/1995 | Muramoto | 600/549 |
| 5,632,555 | 5/1997 | Gregory et al. . | |

FOREIGN PATENT DOCUMENTS

| | | |
|---|---|---|
| 58-216922 | 12/1983 | Japan . |
| 60-36925 | 2/1985 | Japan . |

*Primary Examiner*—Diego Gutierrez
*Assistant Examiner*—Maria Fernandez
*Attorney, Agent, or Firm*—Frishauf, Holtz, Goodman, Langer & Chick, P.C.

[57] ABSTRACT

A digital thermometer, having a sensing tip that is integral with a heater, a display, and a microcontroller which samples for rise time and proportionally operates the heater to increase the temperature of the sensing tip in an alternating control sequence that includes a post-heating delay and, thus, the sensing tip quickly arrives at a stable temperature when no further heating is required.

15 Claims, 7 Drawing Sheets

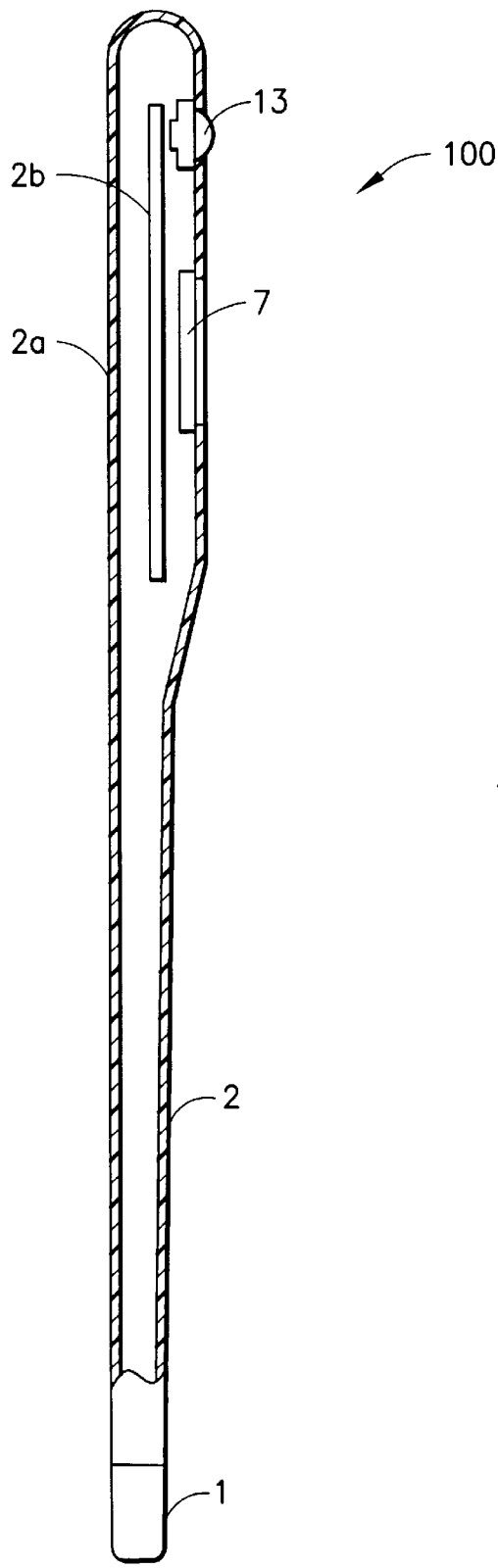
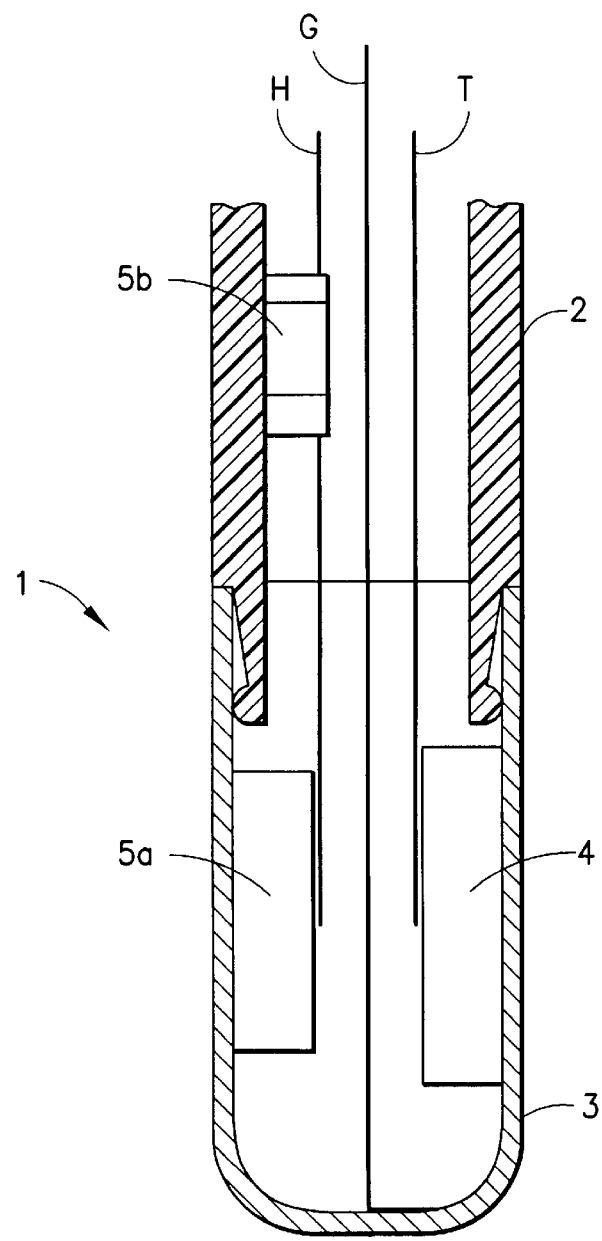
FIG.1A
FIG.1B

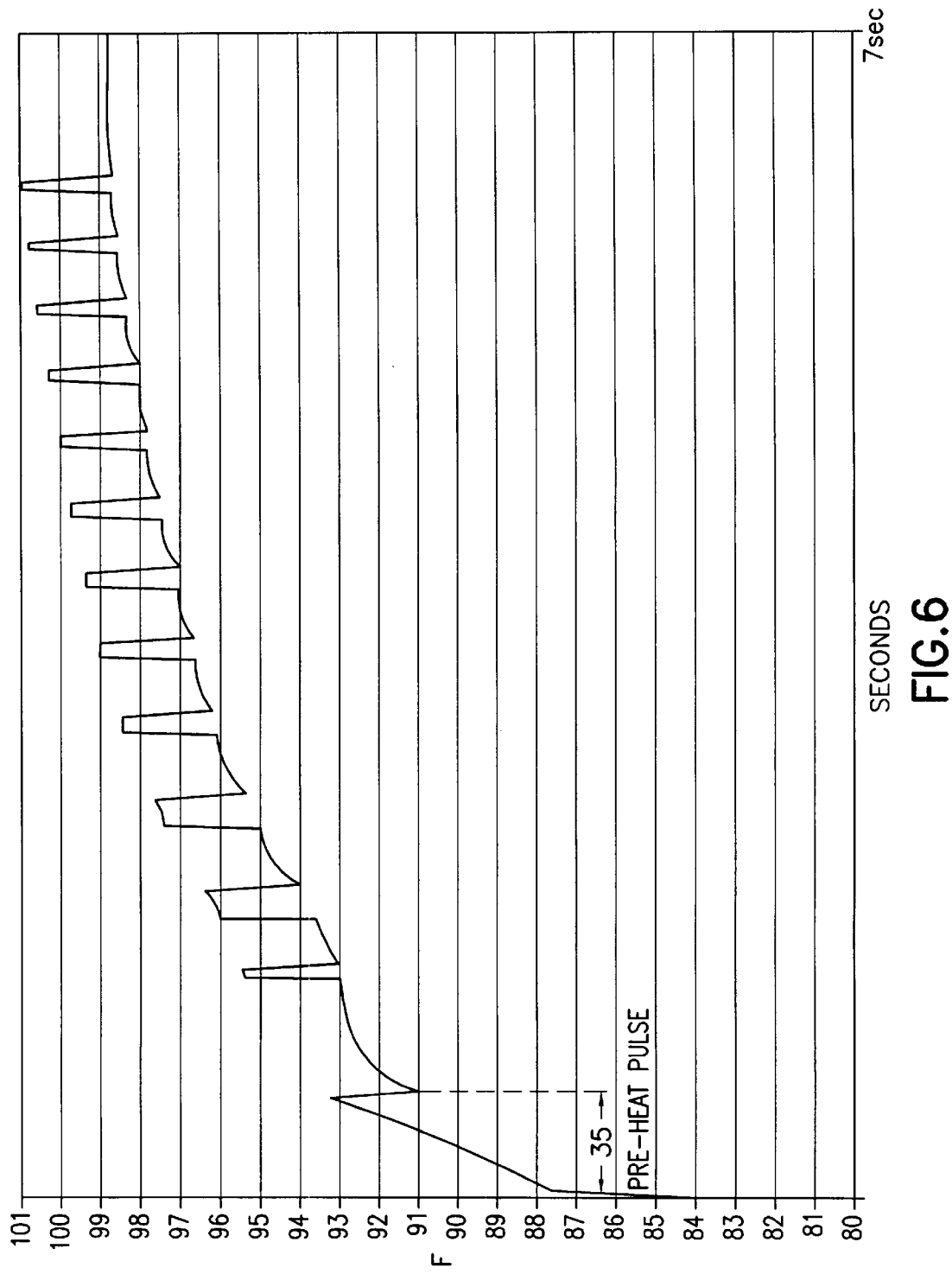

FAST RESPONSE DIGITAL THERMOMETER

FIELD OF THE INVENTION

The present invention is directed to thermometers, and more particularly to a digital thermometer which quickly arrives at a stable temperature.

BACKGROUND INFORMATION

The search for speed in temperature measurement is an unending quest, especially, but not exclusively, in measuring human body temperature. Examples of persons and situations wherein there is a need to obtain quick temperature readings include, inter alia, a physician in an emergency room evaluating the status of a patient, a chef determining whether the interior of a food (e.g. meat) has attained a desired temperature, an HVAC technician checking the air temperature in an air duct, and a mother determining whether her screaming child has a fever. Each of these situations requires that a temperature measurement be obtained in a relatively quick manner.

Traditionally, temperatures (whether of a human, food product or air) were determined using a mercury-in-glass thermometer. This type of thermometer typically requires approximately three (3) minutes to achieve a stable reading. Recently, however, advances have been made to reduce the time required for a thermometer to achieve a stable temperature reading. These advances are most often embodied in low-cost digital fever thermometers which allow for relatively fast temperature detection by the use of a temperature sensor having a relatively low mass and heat capacity.

Digital thermometers typically display a stable temperature reading in half the time required for that of traditional mercury-in-glass thermometers. Recently, infrared thermometers have been developed which attain an even faster stable temperature reading as compared to digital thermometers. This is generally accomplished by measuring the infrared emissions of the tympanic membrane and the ear canal. The infrared thermometers, however, are less accurate than the traditional contact type thermometers and are subject to variability of use, variability of ear canal shape, and inter-ear temperature differences.

One specific approach to quick temperature detection is disclosed in U.S. Pat. No. 4,183,248 to West which teaches reducing heat loss through the thermometer stem by activating a heater in the stem to match the temperature of the temperature sensor. The West patent mentions a 30-second response time using this method. While the heat loss through the thermometer stem is compensated for by the heat produced by the heater, the heat capacity of the sensor tip causes a local cooling on the area of the body which is in contact with the sensor tip, and time is required to replenish the heat loss to this area of the body to obtain an accurate temperature reading.

Another approach to quick temperature detection is disclosed in U.S. Pat. No. 5,632,555 to Gregory wherein a heater is employed to reduce heat capacitance. Gregory teaches heating the thermometer sensor tip to a predetermined temperature of 95° F. before insertion of the tip in the patient's mouth. Thereafter, a temperature rise profile is used to calculate (that is, estimate or predict) a terminal (that is, final stable) temperature. Gregory discloses predicting the terminal temperature in 4 seconds. However, prediction is subject to numerous factors such as insertion time, movement, and pressure variability. In addition, when probe covers are utilized, variations in probe cover thickness and mass must be considered in the prediction routine.

SUMMARY OF THE INVENTION

The present invention overcomes the described drawbacks and provides a new and unique thermometer which quickly arrives at the temperature that is being measured.

It is an object of the invention to control a heater for enhancing the temperature rise of a sensor, quickly arriving at the temperature that is being measured.

It is another object of this present invention to provide an accurate, low-cost, digital fever thermometer that is easy to use and provides a peak hold temperature in a relatively short period of time.

An improved quick-reading thermometer is presented that arrives at a peak temperature with the aid of a heater that is time-proportionally powered in relation to the slope of the temperature rise. A delay time after heating ensures that the degree of temperature rise is from the actual temperature change attributable to the area that is in contact with the thermometer and not as a result of heat dissipated by the heater.

Initially, a heating phase is introduced to the sensor in order to raise the temperature to the lower end of the intended scale. The pulse width is dependent upon the room temperature; the colder the room, the longer the pre-warming pulse. It is not necessary to arrive at an exact temperature, only to bring the probe temperature proximate the lowest expected reading. After the pre-warming pulse, an annunciator, such as a beeper, a display signal or a backlit flashing display, signifies readiness to insert the probe. In the example of a fever thermometer, the probe tip is placed under the tongue. Two sets of samples are read into the microcontroller 200 milliseconds apart, and a temperature rise is determined. The next heating pulse duration and a subsequent delay time are determined dependent upon the rise time. A heating factor and a delay factor multiplied by the temperature rise during the sample interval determine the subsequent heat and delay cycle. After the delay period, the temperature sampling is repeated and a new heat and delay cycle are calculated and executed. The sampling, heating and delay cycles are repeated until the temperature rise is 0.03 degrees within the sample detection period, and one or several verification cycles establish that a near zero slope has in fact been achieved. At this point, the heat loss from the local zone, for example, under the tongue, can be theoretically calculated and a final pulse restores this body heat loss. The final pulse is also compensated for the heat replenishment by controlling the duration inversely proportionally to the response time, the time required to establish the zero slope. The peak temperature is established and displayed on an LCD digital display, and a beeper, backlight or backlit flashing LCD indicates the completion of the reading. The construction optimizes the response time of heat transference from a heater and also the temperature response from the body being measured in order to minimize the delay factors.

A preferred form of the fast response digital thermometer, as well as other embodiments, objects, features and advantages of this invention, will be apparent from the following detailed description of illustrative embodiments thereof, which is to be read in connection with the accompanying drawings.

BRIEF DESCRIPTION OF THE DRAWINGS

FIG. 1A is a cross-sectional view of the fast response digital thermometer of the present invention;

FIG. 1B is a cross-sectional view of the sensor tip of the fast response digital thermometer of the present invention;

FIG. 6 is a temperature-versus-time graph when the method of operation of FIG. 5 is employed;

DETAILED DESCRIPTION OF THE INVENTION

Figure 2:
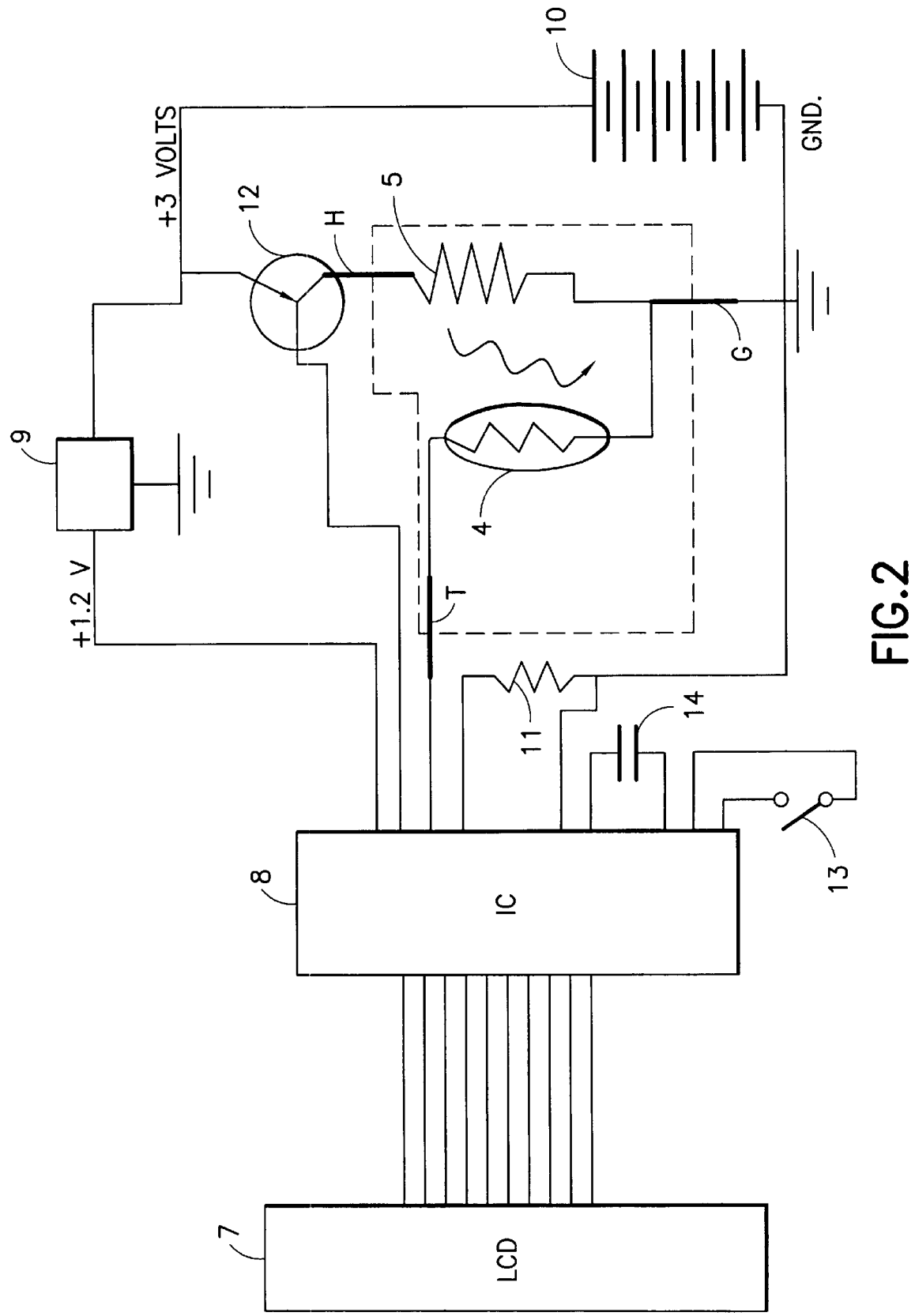
FIG. 2 is a functional circuit diagram of the fast response digital thermometer of the present invention.

Referring now to the drawings and specifically to FIG. 1A, a digital fever thermometer 100 according to the present invention is shown. The digital fever thermometer 100 includes a sensor tip 1 attached to an end of a housing stem 2 which is integral with a case 2a that houses an electronic circuit 2b and display 7 (described in more detail below). The housing stem 2 and case 2a are preferably made of plastic. The housing stem is preferably long and slender. The case preferably has a wider cross-section than the housing stem and an interior volume suitable to accommodate the display 7, a push button switch 13 (actuator) and the electronic circuit 2b.

The sensor tip 1, shown in detail in FIG. 1B, includes a sensor sheath 3 (preferably made of a highly conductive material such as copper) which is attached to an end of the housing stem 2. A surface-mounted thermistor 4, preferably having a nominal resistance of 10,000 Ω at 25° C., is coupled to an inside surface of the sensor sheath 3. A surface heater resistor 5a, preferably having a 30 Ω resistance, is also coupled to the inside surface of the sensor sheath 3 but on a side opposite to that of the thermistor 4. In addition to the surface heater resistor 5a, a second heater resistor 5b, shown in series with surface heater resistor 5a, can be used to warm the housing stem 2. This second heater resistor 5b serves to thermally isolate the sensor tip 1. When the second heater resistor 5b is used, the relative resistance of the two heaters, 5a and 5b, are in proportion to the heat capacitances of the sensor sheath and the stem section that are to be heated to the same temperature. Since the thermal capacitance of the plastic stem is lower than that of the copper sheath, the resistance of second heater resistor 5b is lower than the resistance of surface heater resistor 5a. When a stem heater is used in the example described, the resistance of the second heater resistor 5b is 5 Ω and that of the heater resistor 5a is 25 Ω. The surface-mounted thermistor 4 is preferably bonded directly to a portion of the sheath in a manner which ensures that the thermistor will be in substantial contact therewith and maintained at substantially the same temperature as that of the sensor sheath 3. In one embodiment, the thermistor is a 0.60" by 0.60" square and 0.15" thick. In a similar manner to the mounting of thermistor 4, the surface heater resistor 5 is bonded directly to the sensor sheath. Both the thermistor 4 and surface heater resistor 5a have a mounting surface that coincides with the curvature of the inside surface of the sensor sheath 3 to maximize surface contact and heat transfer with the sensor sheath 3.

The sensor sheath 3 is preferably formed from a flat metal strip that is bent to approximately a 0.05 inch radius. Alternatively, the sensor sheath is formed from a drawn tubular section rounded at one end wherein the sides include flat sections on opposite sides so that the thermistor 4 and heater resistor 5a (which preferably have flat mounting surfaces) can be coupled thereto.

The thermometer 100 also includes a ground wire G coupled to both an inside portion of the sheath (for example, via spot welding) which effectively couples the ground wire G to first ends of surface heater resistor 5a and thermistor 4, and ground potential (see FIG. 2). The digital fever thermometer 100 further includes a thermistor wire T. The thermistor wire T is coupled to a second end of the thermistor 4 and the microprocessor 8 (see FIG. 2). A heater wire H is also included and coupled between the heater resistor Sa and transistor 12 (see FIG. 2). The ground wire G, thermistor wire T and heater wire H are preferably made of an alloy that has a high electrical conduction and relatively low thermal conduction to deliver sufficient power to the heater and minimize the heat loss through the conductors. For example, 34 AWG nickel can be used for this purpose.

The resistance of the thermistor 4 tracks the temperature of the sensor sheath 3 (that is, the resistance of the thermistor increases as the temperature increases and the resistance decreases as the temperature decreases). The temperature of the sensor sheath is monitored by a microprocessor 8 (explained below) to control operation of the heater resistor 5a. Powering the heater resistor 5a generates heat energy which is transferred to and which increases the temperature of the sensor sheath.

Referring now to FIG. 2, a functional circuit diagram of the digital fever thermometer 100 in accordance with the present invention is shown. The digital fever thermometer includes a battery 10 which, in the preferred embodiment, is a 3 volt power supply. Operatively coupled to the positive terminal of the battery is a voltage regulator 9 which regulates the 3 volt power supply input to a 1.2 volt output. The 1.2 volt output of the voltage regulator 9 is coupled to a microprocessor 8. Operatively coupled to the microprocessor is a liquid crystal display (LCD) 7 for displaying, inter alia, the detected temperature.

The functional circuit diagram of the digital fever thermometer also includes the surface heater resistor 5a having one terminal coupled to ground potential (or the negative terminal of the battery 10) and a second terminal coupled to the 3 volt power supply through transistor 12. The transistor 12 is preferably a PNP transistor having its collector coupled to resistor 5a, the base coupled to the microprocessor and the emitter coupled to the positive terminal of battery 10. A thermistor 4 is included wherein one terminal is coupled to ground potential and a second terminal is coupled to the microprocessor 8 such that the microprocessor 8 samples the thermistor to detect a rise in temperature which corresponds to an increase in temperature of sensor sheath (not shown in FIG. 2). The digital fever thermometer also includes a reference resistor 11. The resistance value of the reference resistor 11 is selected to correspond to the preselected categorized thermistor 4 and thus calibrates the thermometer. The microprocessor 8 samples both the thermistor 4 and the reference resistor 11 and makes a ratiometric analogue to digital conversion comparing the known resistance of the reference resistor to the resistance of the thermistor 4 to determine the temperature of the thermistor 4.

The digital fever thermometer also includes a clock crystal oscillator 14 having both terminals thereof coupled to the microprocessor 8, and a push-button switch 13 (actuator) for indicating, inter alia, to the microprocessor that the temperature sensing operation is to begin. More specifically, the push-button switch 13 initiates the microprocessor and readies the electronics for operation. As explained in more detail below, the microprocessor 8 periodically samples the thermistor 4 to detect an increase in temperature. A comparison is made with the reference resistor 11 and an analog-to-digital conversion is made within the microprocessor to convert the electronic signals into temperature values. When a rise in temperature is detected by microprocessor 8 via thermistor 4, the microprocessor 8 alternately switches the transistor 12 to selectively power the heater resistor. A clock crystal oscillator 14 keeps time and an internal counter is used to sequence and keep track of delay and sample times.

The microprocessor 8 preferably includes a standard display driver to operate the LCD 7 for displaying messages, measured temperatures, and values stored in a memory (not shown). An auto-off feature is preferably incorporated into the microprocessor 8 to turn the microprocessor off after an extended period of inactivity (for example, five minutes) to extend the life of the batteries. It is also foreseen that the push-button switch 13 can be utilized to recall prior temperature readings from memory (not shown) and turn the microprocessor off.

Figures 3, 3A, 3B:
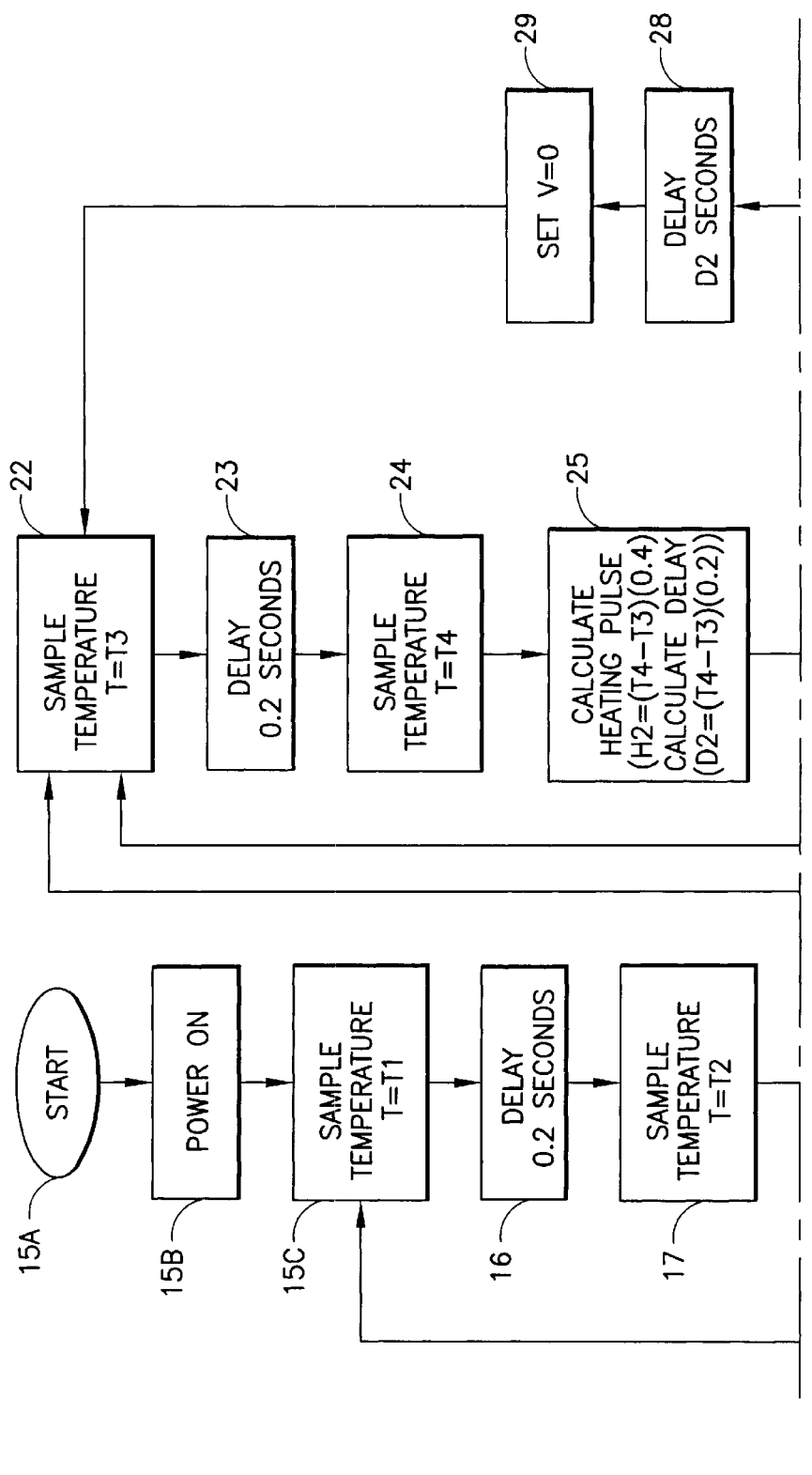
FIG. 3 is a flow diagram of the method of operation of the fast response digital thermometer of the present invention.
Figure 3B:
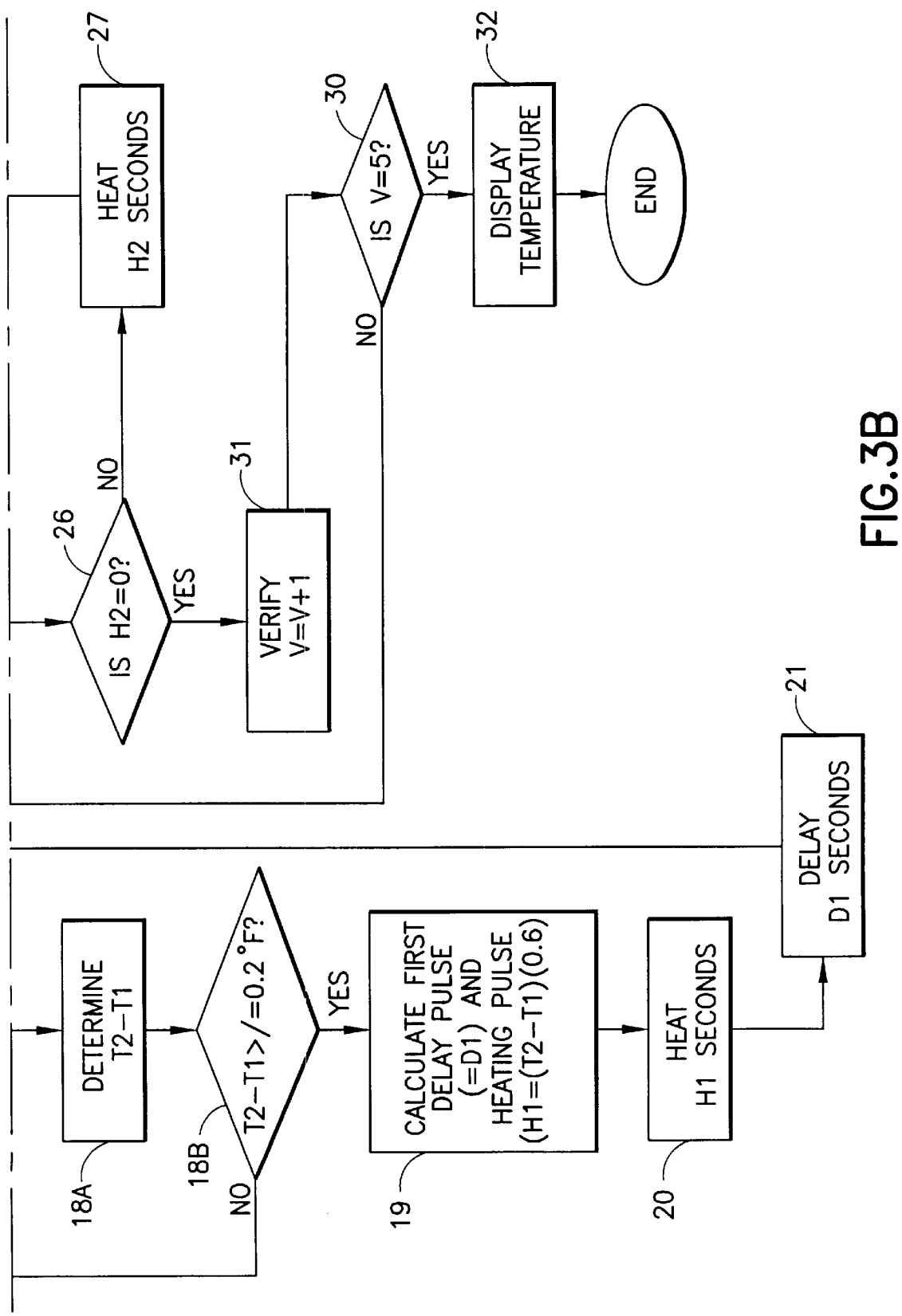

Referring now to FIG. 3, the method of operation of the fast response digital thermometer according to the present invention will now be described. Upon activation of push-button switch 13 (Step 15A), power is provided from battery 10 to the microprocessor (Step 15B). Thereafter, a series of temperature samples of the sensor tip is taken to determine a first temperature value T1 (Step 15C). In the preferred embodiment, five temperature samples are taken at a 100 Hertz sampling rate, (every 0.01 sec.) and the samples are averaged to provide the first temperature value T1. Thereafter, a delay of 0.2 seconds occurs (Step 16), a second set of five temperature samples of the sensor tip are taken (Step 17) and averaged to provide a second temperature value T2. A temperature differential between T2 and T1 (T2−T1) is determined (Step 18A) and the temperature differential is compared to 0.2° F. (Step 18B). If T2−T1 is greater than or equal to 0.2° F. (YES in Step 18B), then it is determined that the sensor tip has been placed under a patient's tongue. This assumption is made since a rise of 0.2° F. within 0.2 seconds (the length of the delay between the sampling times of 1 and T2) is unlikely under normal ambient room conditions. If T2−T1 is less than 0.2° F. (NO in Step 18B), then it is assumed that the sensor tip has not been placed under the patient's tongue, and the method returns to Step 15C wherein the sample-delay-sample-determination loop (Steps 15C, 16, 17, 18A, 18B) is repeated until the result of Step 18B is "YES".

If T2−T1 is greater than 0.2° F. (YES in Step 18B), then the method proceeds to a heating phase wherein an initial heating and delay cycle (Step 19) is calculated. Specifically, a first heating pulse duration H1 is calculated by multiplying an initial heating factor of 0.6 with the temperature difference T2−T1. The 0.6 heating factor is chosen considering the mass, the heat transfer rate, and the thermal capacitance of the sensor sheath. With a small mass and thus reduced thermal capacitance, the heating factor can be reduced. Too large of a heating factor may cause the heating to overshoot the final temperature there by providing an improper temperature reading.

Since a typical T2−T1 differential upon insertion of the sensor tip under the tongue is on the order of 2° F., the duration of the first heating pulse is typically 1.2 seconds (that is, (0.6)*(2)). In a similar manner, the duration of the first delay cycle D1 is the product of the initial delay factor of 0.3, and the temperature differential T2−T1, resulting (for the example of T2−T1=2° F.) in a post-heating delay of 0.6 seconds (i.e., 600 milliseconds which is the product of 0.3 and 2° F.). Thereafter, the first heating pulse cycle H1 (Step 20) and the first delay cycle D1 (Step 21) are executed.

Next, the repetitive alternation of sample-delay-sample (Steps 22, 23, 24) similar to Steps 15, 16 and 17 occurs wherein five consecutive temperature samples of the sensor tip are taken (100 Hertz sampling rate) and averaged to determine a third temperature value T3, a delay of 0.2 seconds occurs, and the next five consecutive temperature samples of the sensor tip (100 Hertz sampling rate) are averaged to determine a fourth temperature value T4. The values T3 and T4 are utilized to determine whether there is an increase in temperature of the sensor tip as a result of contact with the body. Thereafter a second heating pulse duration H2 and a second delay cycle D2 are calculated (Step 25) using a heating factor of 0.4 and a delay factor of 0.2 wherein H2=(T4−T3)*(0.4) and D2=(T4−T3)*(0.2). Thereafter, the second heating pulse duration is compared to zero (Step 26) to determine if a stable temperature has been reached. Specifically, if the second heating pulse duration H2 is equal to zero (YES in Step 26), then a stable temperature has been reached. However, if the second heating cycle is not equal to zero (NO in Step 26), this indicates that a stable temperature has not yet been reached and therefore the second heating pulse duration (Step 27) and second delay cycle (Step 28) are executed. Thereafter, a verification counter (V) is set to zero (Step 29). The verification counter (described in more detail below) is used to confirm that a stable temperature has been reached by determining that a predetermined number of consecutive comparisons of H2 with zero at Step 26 have the same result (that is H2=0). Thereafter, the program returns to Step 22 to calculate the next heat/delay cycle.

Within a few seconds of numerous sample-delay-sample and heat-delay stages, a stable sensor temperature is achieved and H2 (in reality that is, T4−T3) is less than a minimum temperature change, in this case less than a 0.01° F. change within the sampling period (YES in Step 26). Stability factor of 0.01° F. within 0.3 seconds is given for the purpose of example. However, a range between 0.0010 and 0.060 can be considered stable, and a negative stability factor between −0.060 and −0.001° can also be considered stable that may result from a slight overheat. At this point, a predetermined number of verification cycles (V) of the value of H2 are repeated to check that the measured temperature has remained constant. In one embodiment, five verification cycles are repeated. After it is determined that H2 is equal to zero, V is incremented by one (Step 31) and a comparison is made to determine if V is equal to 5. If V is less than 5, the method returns to Step 22 wherein another sample-delay-sample cycle (Steps 22–26) is conducted to determine if H2 is still equal to zero and V is incremented. When V=5 (YES in Step 30), then five consecutive cycles have verified a stable temperature and the microprocessor is instructed to display the temperature (Step 32).

The heating and delay factors, multiplied by the temperature sampling differential, specify the heating and delay time periods. The delay time periods which occur after heating are dependent upon the response of the sensor tip and whether the temperature of the heater resistor has stabilized. In this way, the temperature sampling gives the result of the temperature rise from the body and not from the heater. The mass and heat transfer coefficient and the shape of the sensor sheath determine the temperature response. A low mass and a high thermal conductivity of the sensor tip is desired. Other factors, such as heat capacity, are also considered in selecting the sheath material and in sizing the resistor. The heating factors and delay factors in FIG. 3 are based on the sensor tip being made of a copper sheath 0.120" by 0.150" having a cross-section cap with a 0.007" wall thickness.

Figure 4:
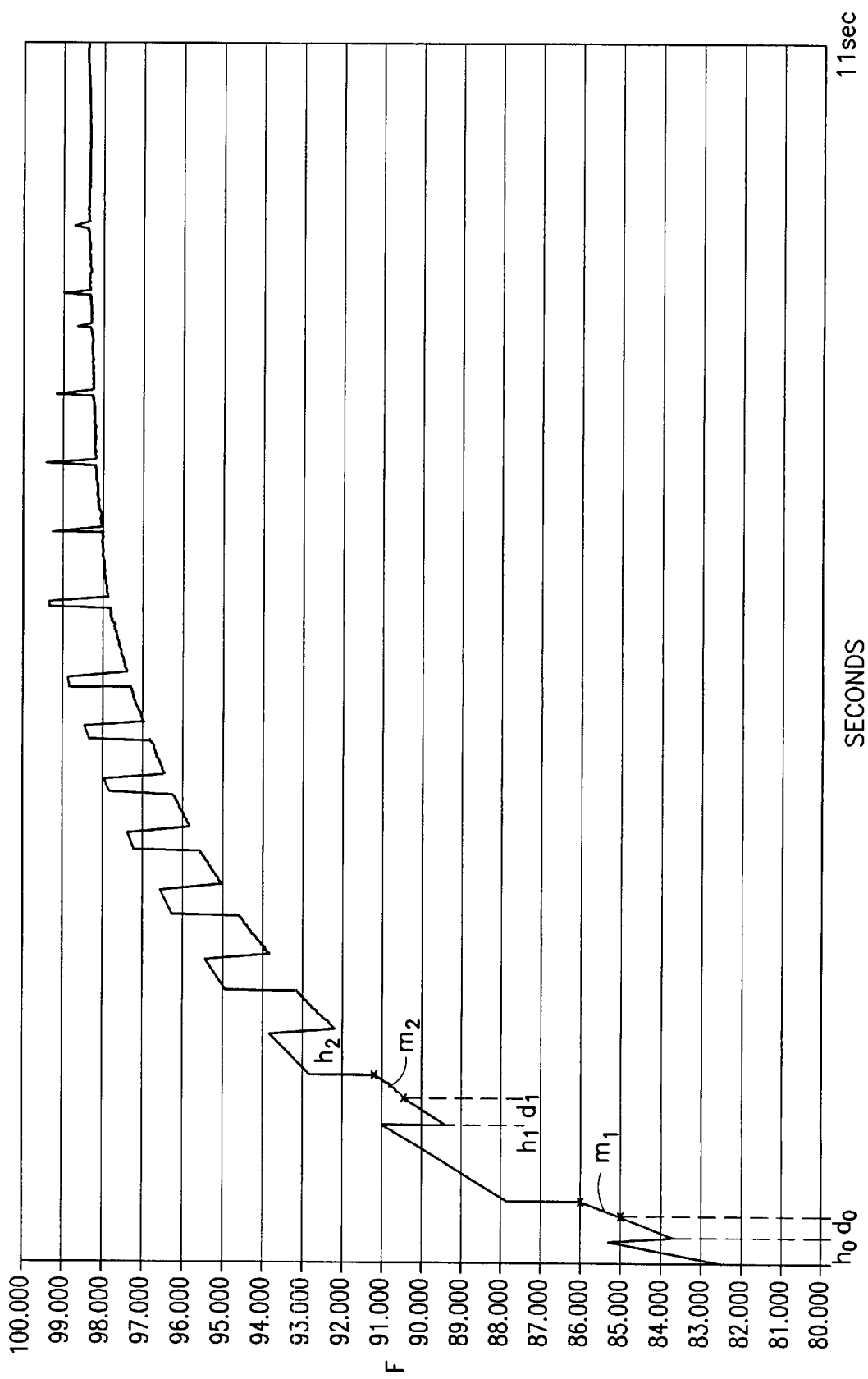
FIG. 4 is a temperature-versus-time graph when the method of operation of FIG. 3 is employed.

Referring now to FIG. 4, a curve representative of the increase in sensor temperature and the reaction rates for the heat/delay cycles is shown. As the sensor temperature approaches the final (stable) temperature, the slope (m) of the sampling cycle diminishes which, in turn, reduces the duration of the heating and delay periods. During the heating periods, the current draw from the battery is substantial and the signal from the thermistor is weakened, causing an offset of the thermistor signal, as evidenced by the pulses in the temperature curve. No sampling needs to take place during the heating pulse.

As seen in both the flow chart of FIG. 3, and the sensor temperature curve of FIG. 4, the thermometer monitors the temperature rise. Referring specifically to FIG. 4, once a temperature rise is detected of at least 0.2° F. in a 0.3 second sampling period, a first heating pulse ($h_0$) of 0.3 seconds causes the temperature rise to become steeper. After the first heating pulse is executed, a delay period, $d_0$, of 0.3 seconds equalizes the distribution of heat provided by the heating resistor to the sensor tip assembly, and readies the sensor tip for sampling. After the delay period $d_0$, the slope ($m_1$) of the curve is measured to determine the next heating pulse and delay period (that is sample temperatures are measured over a 0.3 second sampling period to determine if $h_n=0$). The subsequent measure, heat, and delay cycle is repeated in an iterative diminishing sequence ($m_1$, $h_1$, $d_1$), ($m_2$, $h_2$, $d_2$) . . . ($m_x$, $h_x$, $d_x$) as the measured slope ($m_x$) becomes zero (that is, as $h_n$ diminishes and approaches 0). The stability of the temperature is verified (via Steps 30 and 31) and the temperature is displayed (Step 32).

Figure 5:
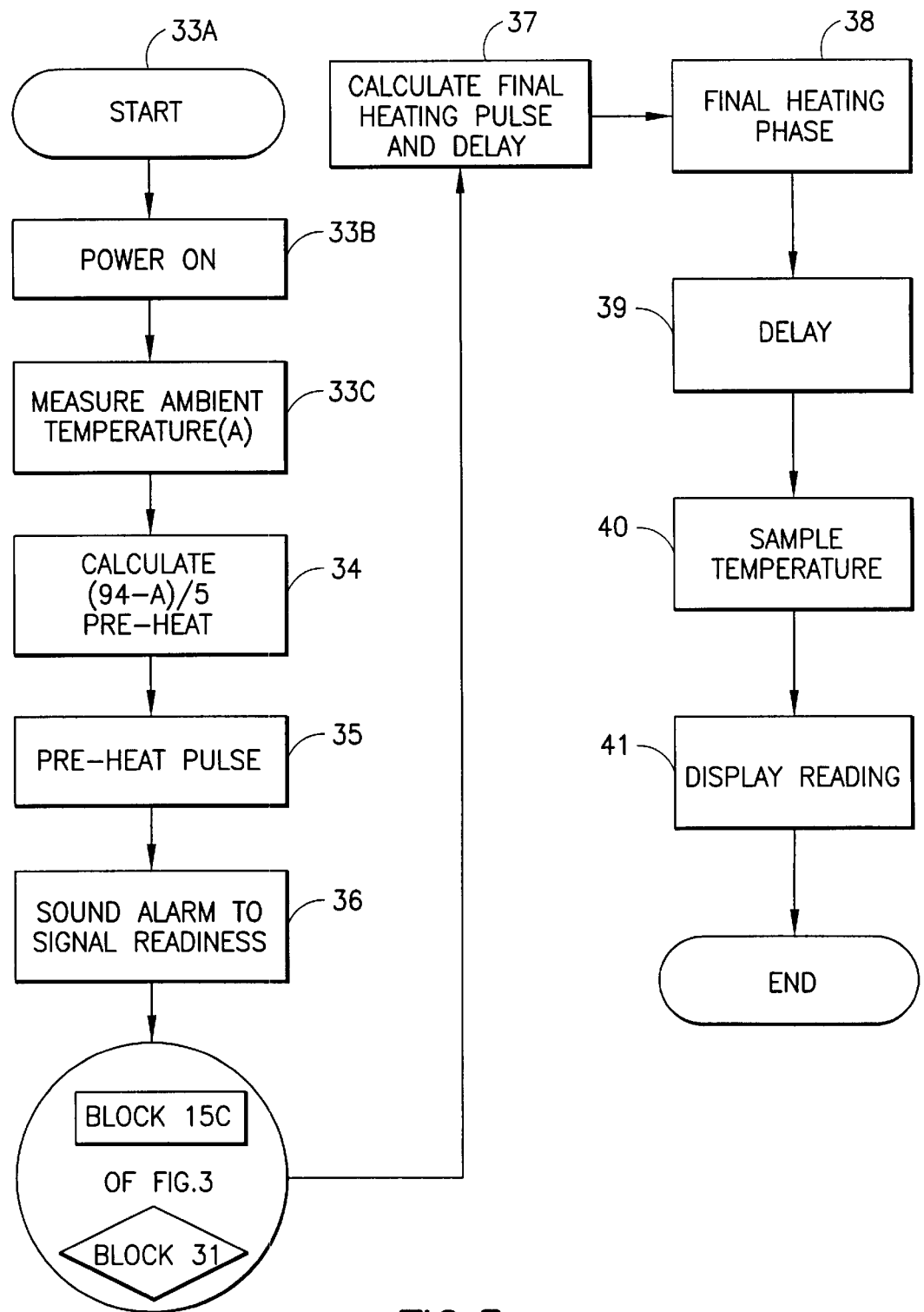
FIG. 5 is a flow diagram of an alternate method of operation of the fast response thermometer.

In an alternative embodiment as shown in FIGS. 5 and 6, the heat loss from the body (usually from under the tongue) whose temperature is being measured, is minimized and compensated for. After the push-button switch 13 is activated (Step 33A) and power is supplied to the microprocessor (Step 33B), the ambient temperature (A) is measured (Step 33C) and a pre-heat pulse duration is calculated (Step 34) for a pre-heat cycle. The pre-heat pulse duration is determined by dividing the difference between the ambient temperature (A) and 94° F. by the expected temperature rise per second, which, for example, may be 5° F. per second. After the pre-heat pulse (Step 35), the temperature quickly stabilizes at 93° F., and an alarm indicates to a user that the thermometer is ready for insertion of the probe in the patient's mouth. Thereafter, the control sequence depicted in Steps 15C–30 of FIG. 3 are executed. Alternately, the sensor tip is heated to and maintained at a controlled temperature, such as 95° F. and, once stable, a readiness alarm is activated instructing the user to insert the thermometer under the patient's tongue (Step 36). Upon the arrival at the stable terminal temperature (YES in Step 30), a calculation is made to determine the heat input from the body (Step 37). If, for example, a reading is detected in only 7 seconds, a portion of the heat gain by the sensor tip is from the local zone under the tongue. A total of 7 seconds is not long enough for the body to replenish the local heat loss. Therefore the heater can provide the exact amount of heat back to the local area. For example, the starting temperature, 95° F., is subtracted from the terminal temperature, which is, for example, determined to be 98.2° F., giving a total temperature rise of 3.2° F. The total accumulated heating time, the sum of all of the individual heating pulses, is measured to be 0.6 seconds. If the entire heat input came from the heater, it would take (3.2° F.)÷(5° F./second), or 0.64 seconds. A final heating pulse (Step 38) of 0.64−0.6 or 0.04 seconds would restore the heat loss. A delay period (Step 39) follows the final heating pulse and then a sample temperature is taken. The plot in FIG. 6 shows the pre-heat and post-heat cycles and the resulting short detection times.

Alternately, the post-heat cycle can be avoided by employing the theoretical rise in temperature of a 0.14 second pulse at a response of 5° F. per second of heater operation [(5)(0.04)=0.2° F.], yielding a final temperature of 98.4° F. Overall detection time, the time between the first insertion and the final reading, can be considered as a factor that diminishes the final pulse due to the replenishment of heat loss by the body's circulation and conduction. Without the heater, the entire heat input is from the body, and then replenishment of the heat by the body is the major time period toward stability. Typically, for a 3° F. rise, for example 95° F. to 98° F., stability is achieved in 30 seconds without the addition of heat from the heater. A rate of 0.1° F. per 16 seconds is considered to be stable. At a total detection time of 30 seconds, the final pulse is zero since the body has already replenished the heat to the portion of the body that is in contact with the tip of the thermometer. For a 5 second detection time, only 5/30 of the potential heat loss by the body has occurred, or 0.16 of the total. So, in the above example, the theoretical addition of 0.2° F. is reduced by (0.2)/(1.16), to account for the heat replenished by the body during that 5 second period. As a result, the final temperature is increased by 0.172, which results in a temperature of 98.372° F., and a reading of 98.4° F. is displayed.

In actuality, the body replenishment of heat loss is relatively linear. Relating to blood flow, however, the heat transfer to the tip is in a diminishing proportion related to time, since the temperature change is greater in the early rise cycle. Therefore, the balance between heat loss and heat gain is non-linear in a diminishing nature. This factor is illustrated by FIG. 4. The slope of the first measurement cycle, m1, is greater than the slope of the second measurement cycle, m2, with the temperature change resulting from the heat transfer from the body to the sensor. Heat transfer is not linear with time. The need to compensate for body heat loss is reduced by having a low heat capacitance tip, and is also reduced with longer detection time.

Although illustrative embodiments of the present invention have been described herein with reference to the accompanying drawings, it is understood that the invention is not limited to those precise embodiments, and that various other changes and modifications may be affected by one skilled in the art without departing from the scope or spirit of the invention. For example, the example circuit uses a 3 volt power supply, essentially 2 AAA batteries, and regulates to 1.2 volts for the microprocessor. It is conceivable that other single voltage supplies can be used, even 6 volt or 9 volt supplies, without changing the nature of the invention. The example shows a common ground connecting the heater and thermistor, but two grounds can be used as well. The analog to digital conversion as described is one technique known in the art. Other methods can be used with the same success. The shape and mass of the sensor tip is chosen to exemplify and to describe the relationship of the design to the heater and delay parameters only; no constraint on the design is implied. While the invention is described as being used on humans, the thermometer and method can be used for any type of temperature measuring purpose such as measurement of animal temperatures, during cooking, liquid temperature, vapor temperature, etc. These and all other modifications are intended to fall within the scope of the present invention as defined by the following claims.

What is claimed is:

1. A method of determining a temperature of a patient using a thermometer having a conductive tip and a heater thermally coupled thereto, the method comprising the steps of:

a) activating the heater responsive to determining that the thermometer has been inserted in the patient;

b) heating the conductive tip with the heater for a first specified heating period after it is determined that the thermometer has been inserted in the patient;

c) executing a delay for a first specified delay period; and d) determining, after said first specified heating period and said first specified delay period, whether the thermometer has attained a stable temperature corresponding to the patient's temperature.

2. The method of determining a temperature of a patient according to claim 1 wherein step (a) further comprises the steps of:

measuring a first temperature of the conductive tip;

executing a delay for a predetermined period of time;

measuring a second temperature of the conductive tip; and determining whether the second temperature is at least a predetermined amount greater than the first temperature.

3. The method of determining a temperature of a patient according to claim 2 wherein the step of measuring the first temperature comprises the steps of:

sampling the temperature of the conductive tip a plurality of times to obtain a plurality of first temperature samples; and determining an average of the plurality of first temperature samples.

4. The method of determining a temperature of a patient according to claim 2 wherein the step of measuring the second temperature comprises the steps of:

sampling the temperature of the conductive tip a plurality of times to obtain a plurality of second temperature samples; and determining an average of the plurality of second temperature samples.

5. The method of determining a temperature of a patient according to claim 2, wherein step (d) comprises the steps of:

measuring a third temperature of the conductive tip;

executing a delay for a predetermined period of time;

measuring a fourth temperature of the conductive tip; and determining whether the difference between the third temperature and the fourth temperature is zero.

6. The method of determining a temperature of a patient according to claim 5 wherein if the difference between the third temperature and the fourth temperature is zero, the method further comprises the steps of:

incrementing a verification counter; and determining whether a counter value corresponding to the verification counter has reached a predetermined value;

wherein if the counter value is not equal to the predetermined value, repeatedly measuring the third temperature, executing a delay, measuring a fourth temperature and determining that the difference between the third temperature and the fourth temperature is zero and incrementing the verification counter until the counter value is equal to the predetermined value.

7. The method of determining a temperature of a patient according to claim 6 wherein when the counter value is at least equal to the predetermined value, the method further comprises the steps of:

displaying one of the third temperature and the fourth temperature.

8. The method of determining a temperature of a patient according to claim 5, wherein if the difference between the third temperature and the fourth temperature is not zero, the method further comprises the steps of:

heating the conductive tip with the heater for a second specified heating period; and executing a delay for a second specified delay period.

9. The method of determining a temperature of a patient according to claim 8, further comprising the step of:

resetting the counter value to zero to indicate that a stable temperature reading has not been attained.

10. The method of determining a temperature of a patient according to claim 8 wherein the second specified heating period and the second specified delay period are a function of a difference between the third and fourth temperatures of the conductive tip.

11. The method of determining a temperature of a patient according to claim 2 wherein prior to step (b), the method further comprises the steps of:

determining the first specified heating period; and determining the first specified delay period.

12. The method of determining a temperature of a patient according to claim 11 wherein the first specified heating period and first specified delay period are a function of a difference between the first and second temperatures of the conductive tip.

13. The method of determining a temperature of a patient according to claim 1 wherein prior to step (a) the method comprises the step of:

measuring an ambient temperature of the conductive tip; and heating the conductive tip to a temperature above the ambient temperature.

14. The method of determining a temperature of a patient according to claim 1 wherein after step (d), the method further comprises the steps of:

calculating a final heating pulse duration and a final delay period;

heating the conductive tip with the heater for the final heating pulse duration;

executing the final delay period;

measuring the temperature of the conductive tip to determine the patient's temperature.

15. The method of determining a temperature of a patient according to claim 1, wherein the stable temperature is attained when there is at most between a 0.001° and 0.06° change in temperature reading within a 0.3 second interval.

* * * * *